(12) United States Patent
Lee

(10) Patent No.: US 8,205,071 B2
(45) Date of Patent: Jun. 19, 2012

(54) METHOD FOR MOVING RIGHTS OBJECTS INTO OTHER DEVICE IN DIGITAL RIGHTS MANAGEMENT

(75) Inventor: Seung-Jae Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 229 days.

(21) Appl. No.: 12/603,442

(22) Filed: Oct. 21, 2009

(65) Prior Publication Data
US 2010/0138645 A1    Jun. 3, 2010

Related U.S. Application Data

(60) Provisional application No. 61/107,313, filed on Oct. 21, 2008, provisional application No. 61/107,332, filed on Oct. 21, 2008, provisional application No. 61/112,159, filed on Nov. 6, 2008.

(30) Foreign Application Priority Data

Dec. 30, 2008 (KR) .................. 10-2008-0137514
Dec. 30, 2008 (KR) .................. 10-2008-0137515

(51) Int. Cl.
*H04L 29/06* (2006.01)
(52) U.S. Cl. ........................ 713/150; 726/26
(58) Field of Classification Search .............. None
See application file for complete search history.

(56) References Cited

U.S. PATENT DOCUMENTS

| | | | | |
|---|---|---|---|---|
| 7,314,169 | B1 * | 1/2008 | Jasper et al. ............... | 235/382 |
| 7,716,489 | B1 * | 5/2010 | Brandt et al. .............. | 713/180 |
| 7,835,992 | B2 * | 11/2010 | Meyer et al. ............... | 705/59 |
| 2005/0210249 | A1 * | 9/2005 | Lee et al. ................... | 713/168 |
| 2005/0268098 | A1 * | 12/2005 | Oh et al. .................... | 713/168 |
| 2007/0038571 | A1 * | 2/2007 | Meyer et al. ............... | 705/51 |
| 2007/0038576 | A1 * | 2/2007 | Lee ............................. | 705/59 |
| 2007/0124583 | A1 * | 5/2007 | Andersson et al. ........ | 713/165 |
| 2008/0040618 | A1 * | 2/2008 | Andersson et al. ........ | 713/193 |
| 2009/0064341 | A1 * | 3/2009 | Hartung et al. ............ | 726/27 |
| 2009/0217036 | A1 * | 8/2009 | Irwin et al. ................. | 713/168 |
| 2010/0212022 | A1 * | 8/2010 | Greevenbosch et al. ... | 726/27 |

FOREIGN PATENT DOCUMENTS

| | | |
|---|---|---|
| JP | 2007025791 A | 2/2007 |
| KR | 10-2005-0101940 A | 10/2005 |
| KR | 10-2006-0011760 A | 2/2006 |

(Continued)

OTHER PUBLICATIONS

J. G. Steiner, et al. "Kerberos: An Authentication Service for Open Network Systems"; USENIX Winter Conference Feb. 9-12, 1988, Dallas, Texas; XP000671489; pp. 191-202.

(Continued)

*Primary Examiner* — Oscar Louie
(74) *Attorney, Agent, or Firm* — Birch, Stewart, Kolasch & Birch, LLP

(57) ABSTRACT

A method, device and system for moving a rights object. The method includes receiving a first move request message including a reqID element indicating a first device ID and a nonce element indicating a random value generated by the first device; receiving a second move request message including a reqID element indicating a first device ID and a nonce element indicating a random value generated by the first device; comparing the reqID element and nonce element of the first move request message with the reqID element and nonce element of the second move request message; and determining whether or not a rights object is moved from the first device to a second device based upon the comparison.

14 Claims, 6 Drawing Sheets

FOREIGN PATENT DOCUMENTS

| | | |
|---|---|---|
| KR | 10-0608205 B1 | 7/2006 |
| KR | 10-0662336 B1 | 12/2006 |
| KR | 10-2007-0113510 A | 11/2007 |

OTHER PUBLICATIONS

Open Mobile Alliance OMA-AD-SCE-V0_9_20080918-D; "Secure Content Exchange Architecture" Draft Version 1.0; Sep. 18, 2008; XP007913623; pp. 1-31.

Open Mobile Alliance OMA-TS-DRM-DRM-V2_1-20081014-A; "DRM Specification" Approved Version 2.1—Oct. 14, 2008; XP7913714A; pp. 1-214.

Open Mobile Alliance OMA-TS-DRM-DRM-V2_1-20081106-A; "DRM Specification" Approved Version 2.1—Nov. 6, 2008; pp. 1-214.

\* cited by examiner

FIG. 5
Replay Cache
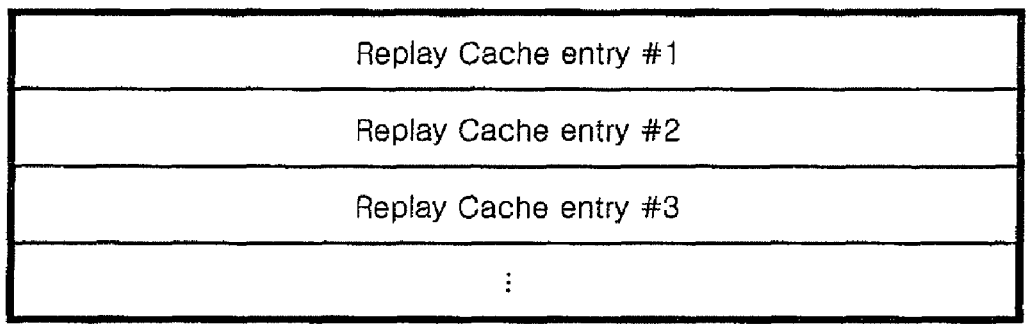
Replay Cache Entry
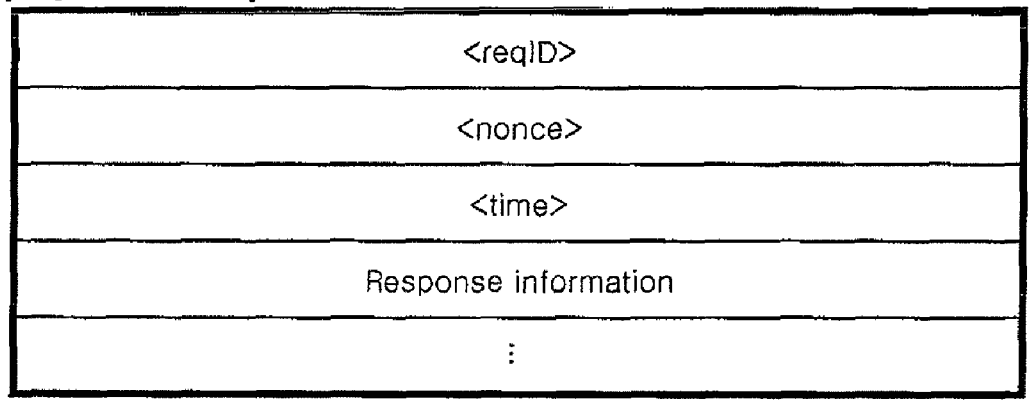
Response Information
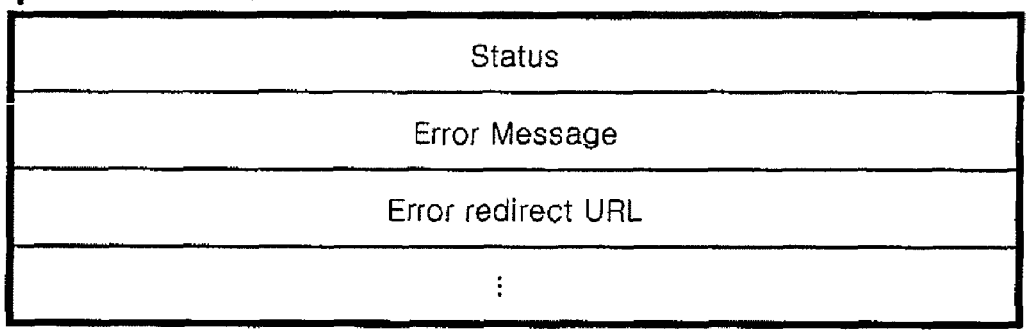

METHOD FOR MOVING RIGHTS OBJECTS INTO OTHER DEVICE IN DIGITAL RIGHTS MANAGEMENT

CROSS REFERENCE TO RELATED APPLICATIONS

The present application is related to and claims the benefit of U.S. Provisional Applications No. 61/107,313 filed on Oct. 21, 2008, No. 61/107,332 filed on Oct. 21, 2008 and No. 61/112,159 filed on Nov. 6, 2008, and the benefit of earlier filing date and right of priority to Korean Applications No. 10-2008-0137514 filed on Dec. 30, 2008 and No. 10-2008-0137515 filed on Dec. 30, 2008, the entire contents of which being incorporated herein by reference.

BACKGROUND OF THE INVENTION

1. Field of the Invention

The present invention relates to a digital rights management (DRM) method, device and system, and more particularly, to a method, device and system for moving a rights object into another device in a digital rights management system.

2. Discussion of the Background Art

Digital Rights Management (DRM) is a technology for safely protecting and systematically managing a rights object for digital contents (e.g., music, movies, literature, images, etc.). DRM prevents unauthorized and/or illegal copying of digital contents. DRM also provides for the acquisition of rights object (RO) for DRM contents, production and distribution of DRM contents, and protection and management for a series of usage processes.

FIG. 1 is an exemplary view illustrating a move of a DRM rights object (hereinafter, 'RO').

As seen in FIG. 1, a conventional digital rights management system may include a rights issuer (RI) 50, a source device 11, and a target device 12.

The rights issuer (RI) 50 issues a rights object (RO) required for using protected contents produced by a contents issuer (not shown).

The source and target devices 11, 12 may include a DRM agent. Commonly, the DRM agent in the source and target devices 11, 12 receives the protected contents and the RO, and converts the protected contents into a form that is usable in the relevant device. Furthermore, the DRM agent analyzes the permission and/or constraint included in the RO to control a use of the contents.

A rights object move protocol known as a 2-pass Move Device RO protocol is illustrated in FIG. 1. The 2-pass Move Device RO protocol is a protocol for moving a rights object (RO) issued by the RI 50 or LRM from the source device 11 to the target device 12, as defined in OMA SCE Enabler v1.0.

It is assumed that the source device 11 carried out a registration protocol in advance, and the RI 50 has a right RI context for the source device 11. After registration, the following steps may be taken.

The RI 50 transmits a move request trigger message, for instance, a Move Device RO Trigger message, to the source device 11 to start a move of the rights object (RO).

The source device 11 transmits a move request message, for instance, a Move Device RO Request message, to the RI 50 to request a move of the rights object (RO). At this time, the rights object (RO) has been issued by the RI 50. If the rights object (RO) is issued by another RI, then the move request message would be transmitted to the another RI.

Optionally, the move request message may include a certificate chain to transfer a certificate of the source device 11 and the source device's associated certificate.

3) Then, the RI 50 examines the move request message. At this time, the RI 50 checks whether or not the rights object (RO) can be moved.

Optionally, the RI 50 may transmit an Online Certificate Status Protocol (OCSP) Request message to an OCSP responder 60 to request a verification of the certificate chain within the move request message.

4) The OCSP responder 60 verifies the certificate chain, and transmits the OCSP Response message to the RI 50.

5) Then, the RI 50 transmits a move request response message, for instance, Move Device RO Response message, to approve a move of the rights object (RO).

6) Subsequently, the RI 50 and the target device 12 carry out a rights object (RO) move procedure. Here, the move procedure includes issuing a new RO to the target device 12.

FIG. 2 is another exemplary view of a move of a rights object (RO) (i.e., for a user domain) according to the related art.

A user domain is a domain in which devices previously set are regarded to be owned by one person and used by sharing the rights object (RO). A domain authority (hereinafter, 'DA') and/or DA enforcement agent (hereinafter, 'DEA'), though not shown, may be used to manage such a user domain.

A procedure for moving a rights object (RO) of the user domain is same as the procedure as illustrated in FIG. 1.

In the move of a rights object (RO) as described above, the source device 11 transmits a move request message to the RI 50. However, if the move request message transmitted from the source device 11 is intercepted or hijacked by a third person, the intercepted move request message is resent to the RI 50. Accordingly, there is a problem that the rights object (RO) may be repeatedly issued to the target device 12.

This problem is caused because a rights object move protocol in the related art, e.g., the previously described 2-pass Move Device RO protocol, is designed in such that even if multiple move request messages including the same ID (for instance, ROID) are received, all the messages are processed to support a partial (or a specific portion) move of the rights object (RO). Here, intercepting, by a mal-intended terminal, a move request message and resending the intercepted move-ment request message repeatedly to the RI 50 is called a replay, and such a type of attack is called a replay attack. However, during a replay attack, the third person performing an intercept cannot change the contents of the message at his own discretion because the move request message is digitally signed.

However, according to the related art, when the source device 11 has transmitted the move request message but the RI 50 has not received it, the source device 11 may resend the message. However, in the related art, it is not defined how the source device 11 constructs the move request message at the time of the resending, or in what method the RI 50 distinguishes the resent move request message from an initial move request message to process it. Hereinafter, the resending is called a retry.

What is required, as discovered by the present inventors, is a method, device and system for solving the previously described problems, along with other problems.

SUMMARY OF THE INVENTION

In order to accomplish the foregoing object, the present invention provides a scheme, device and system for allowing the source device to resend a move request message as well as allowing the RI to prevent a replay attack from a malicious third person.

Specifically, in order to accomplish the foregoing object, the present invention provides a method, device and system for moving a rights object, including the steps of receiving a first move request message including a reqID element indicating a first device ID and a nonce element indicating a random value generated by the first device; receiving a second move request message including a reqID element indicating a first device ID and a nonce element indicating a random value generated by the first device; comparing the reqID element and nonce element of the first move request message with the reqID element and nonce element of the second move request message; and determining whether or not a rights object is to be moved from the first device to a second device based upon the comparison.

Additionally, the present invention provides a server including a transceiver for receiving a first move request message including a reqID element indicating a first device ID and a nonce element indicating a random value generated by the first device, and receiving a second move request message including a reqID element indicating a first device ID and a nonce element indicating a random value generated by the first device; and a processor for comparing the reqID element and nonce element of the first move request message with the reqID element and nonce element of the second move request message, and determining whether or not a rights object is moved from the first device to a second device based upon the comparison.

The present invention allows the source device to resend a move request message as well as allows the RI to prevent a replay attack from a malicious third person.

BRIEF DESCRIPTION OF THE DRAWINGS

FIG. 5 is an exemplary view illustrating a structure of a replay cache according to the present invention.

DETAILED DESCRIPTION OF THE INVENTION

Figure 1:
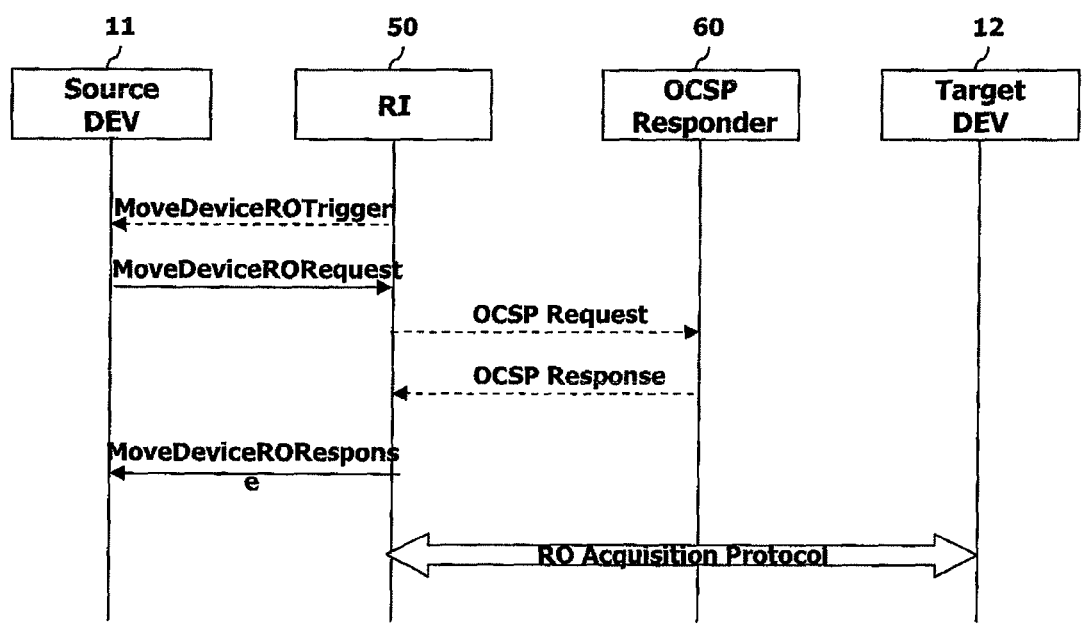
FIG. 1 is an exemplary view illustrating a move of a rights object (RO) according to the related art.
Figure 2:
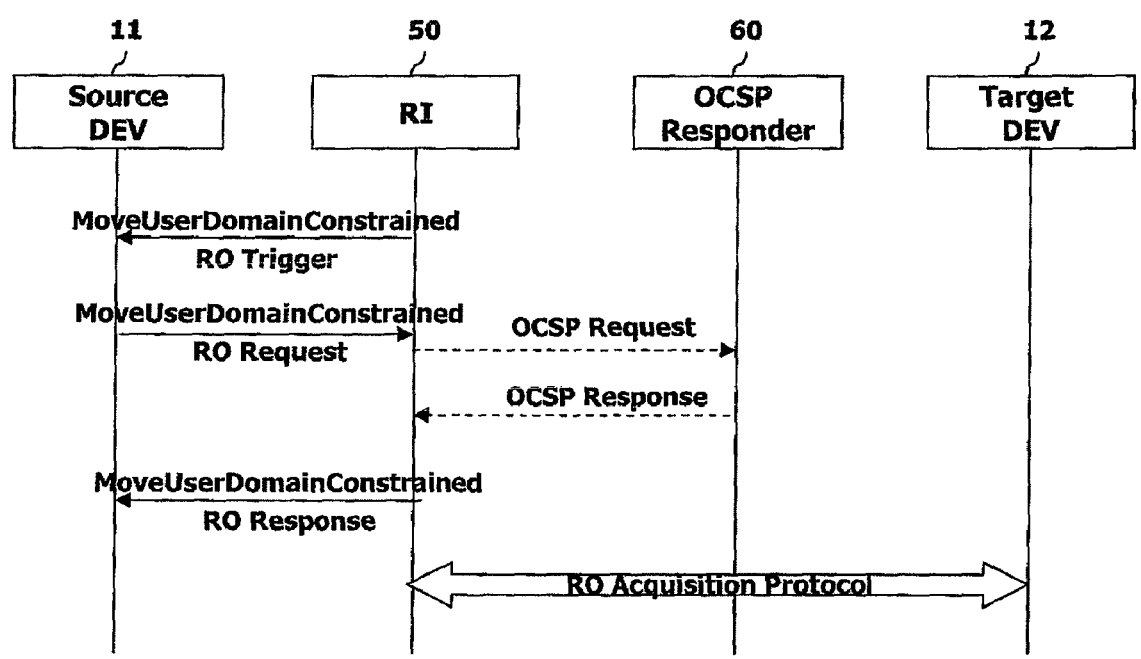
FIG. 2 is another exemplary view illustrating a move of a rights object (RO) according to the related art.

The present invention is applied to a digital rights management (DRM) system. However, the present invention is not limited to this, and is also applicable to all communication systems and methods thereof to which the technological spirit of the present invention can be applied, and also, to other copyright-related systems and methods thereof.

As various modifications can be made and diverse embodiments are applicable to the present invention, specific embodiments will be illustrated with reference to the accompanying drawings and described in detail in the detailed description. However, those specific embodiments should not be construed to limit the present invention, and should be construed as being extended to all modifications, equivalents, and substitutes included in the spirit and technological scope of the invention.

The terms including an ordinal number such as first, second, etc. can be used to describe various elements, but the elements should not be limited by those terms. The terms are used merely for the purpose to distinguish an element from the other element. For example, a first element may be renamed to be a second element, and similarly, a second element may be renamed to be a first element. Furthermore, it will be understood that the term "and/or" includes any and all combinations of one or more of the associated listed items.

In case where an element is "connected" or "linked" to the other element, it may be directly connected or linked to the other element, but another element may be present therebetween. On the contrary, in case where an element is "directly connected" or "directly linked" to another element, it should be understood that no other element is present therebetween.

It should be noted that the terms used herein are merely used to describe a specific embodiment, but not to limit the present invention. Incidentally, unless clearly used otherwise, expressions in the singular number include a plural meaning. In this application, the term "comprising," "including," or the like, intend to express the existence of the characteristic, the numeral, the step, the operation, the element, the part, or the combination thereof, and do not intend to exclude another characteristic, numeral, step, operation, element, part, or any combination thereof, or any addition thereto.

Unless defined otherwise, the terms used herein including technological or scientific terms have the same meaning that is generally understood by those ordinarily skilled in the art to which the invention pertains. The terms used herein shall not be interpreted not only based on the definition of any dictionary but also the meaning that is used in the field to which the invention pertains. Also, unless clearly defined, the terms used herein shall not be interpreted too ideally or formally.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention.

Figure 3:
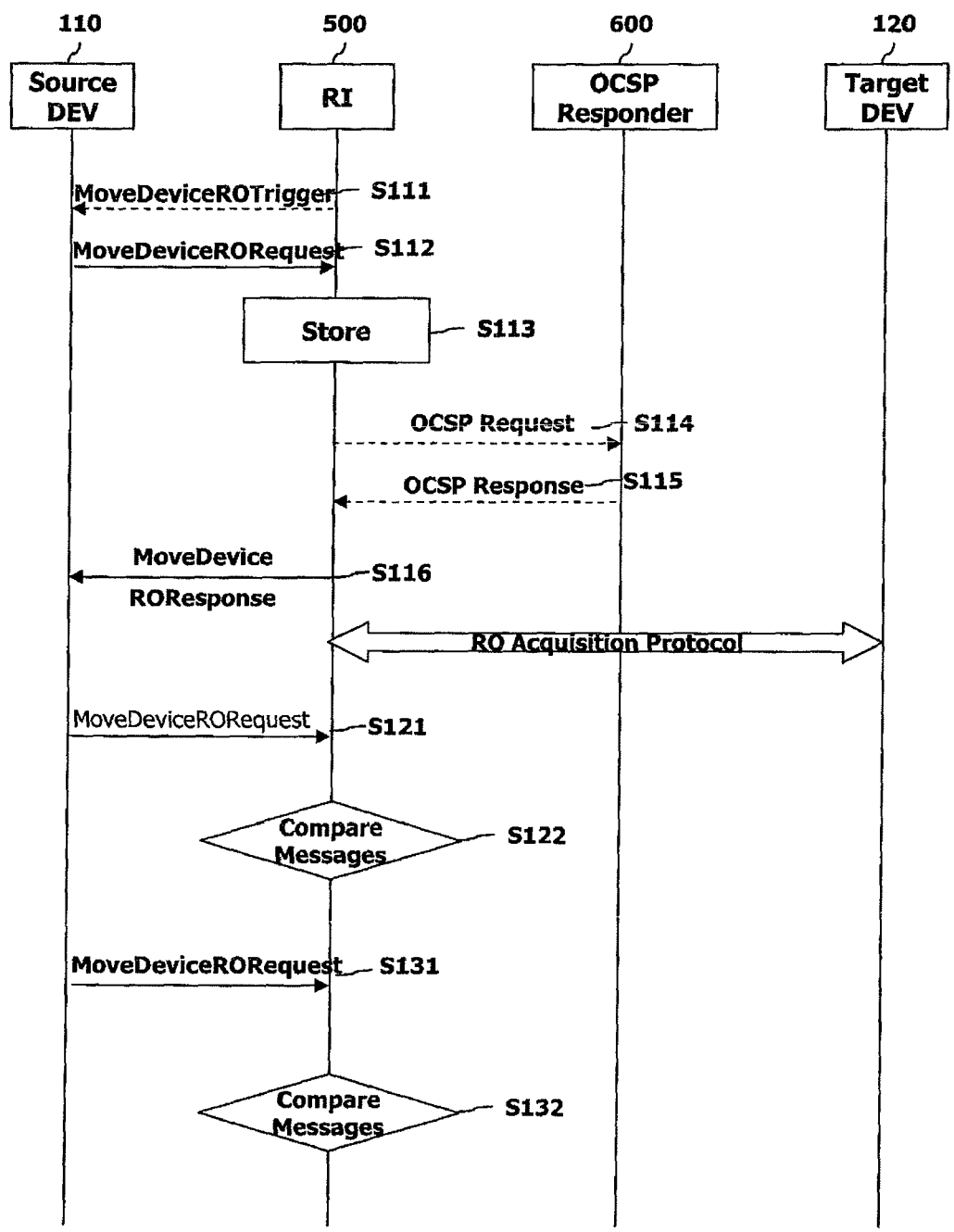
FIG. 3 is an exemplary view illustrating a method according to the present invention.

FIG. 3 is an exemplary view illustrating a method according to the present invention, and FIG. 5 is an exemplary view illustrating a structure of a replay cache according to the present invention.

The move of a rights object for user domain is not illustrated in FIG. 3, but the present invention does not exclude the move of a rights object for user domain. On the contrary, the move of a rights object for user domain is easily understood for a person skilled in the art from the contents of FIG. 3, and therefore, it is merely omitted herein so as to not obscure the gist of the invention. Accordingly, the scope of the present invention should be also construed to include the move of a rights object for user domain.

A digital rights management system according to the present invention is illustrated in FIG. 3. The digital rights management system includes a rights issuer (RI) 500, a source device 110, and a target device 120.

The rights issuer (RI) 500 issues a rights object (RO) required for using protected contents produced by a contents issuer (not shown).

The source and target devices 110, 120 include a DRM agent. Commonly, the DRM agents in the source and target devices 110, 120 receive the protected contents and the RO, and convert the protected contents into a form that is usable in the relevant device. Furthermore, the DRM agents analyze the permission and/or constraint included in the RO to control the use of the contents.

Hereinafter, as illustrated in FIG. 3, it is assumed that the source device 110 carried out a registration protocol in advance, and the RI 500 has a right RI context for the source device 110.

The RI 500 may transmit a move request trigger message, for instance, Move Device RO Trigger message, to the source device 110 to start a move of the rights object (RO) (S111). Alternatively, the RI 500 may not transmit a move request trigger message.

The source device 110 transmits a move request message, for instance, Move Device RO Request message, to the RI 500 to request a move of the rights object (RO) (S112). At this time, the rights object (RO) is issued by the RI 500. If the rights object (RO) is issued by another RI, then the move request message should be transmitted to the another RI.

If the rights object (RO) is issued from a local rights manager (LRM), then the rights object (RO) includes information on which RI can move the rights object (RO). At this time, the information is expressed in a <moveIndication> element within the rights object (RO). Accordingly, the source device 110 can transmit the move request message to the relevant RI based upon the information.

On the other hand, the move request message may include a certificate chain to guarantee a modification of the message.

Furthermore, the move request message may include at least a reqID, a nonce, and time parameters. Here, the reqID parameter indicates an ID of the source device. The reqID may be a hash value in the SPKI field of the certificate in the source device. The nonce parameter is a random value generated by the source device. The random value may be an eigen value, where the source device can generate other random values whenever generating the move request message. The time parameter may be specified (e.g., universal time code (UTC)) that is a time recognized by the source device. The time code may or may not be changeable by a user at his discretion.

3) Then, the RI 500 examines the move request message. At this time, the RI 500 checks whether or not the rights object (RO) can be moved. If the rights object (RO) is generated by the LRM, then the RI 500 may check with the LRM to determine whether or not the move of a rights object is supported.

Furthermore, the RI 500 processes the move request message, and stores the result of processing the move request message, for instance, the result of processing the ReqID, Nonce, and time parameters of the message in a memory, for instance, a replay cache as illustrated in FIG. 5 (S113).

At this time, the memory, for instance, the replay cache as illustrated in FIG. 5, stores a ReplayCacheItem corresponding to the result of processing the ReqID, Nonce, and Time parameters.

The memory, for instance, the replay cache as illustrated in FIG. 5 stores the ReplayCacheItem until a value of the time parameter is at least within a time value or a margin of the time value allowed by the RI 500. For example, if the margin allowed by the RI 500 is an hour, and the value of the time parameter is 3:00 p.m., then the ReplayCacheItem can be stored at least until 4:00 p.m.

Furthermore, the processing result includes sufficient information for constructing a Move RO Response message, for example, information on whether it was Success or Error.

4) On the other hand, the RI 500 may transmit an Online Certificate Status Protocol (OCSP) Request message to an OCSP responder 600 to request a verification of the certificate chain within the move request message (S114).

5) The OCSP responder 600 verifies the certificate chain, and transmits the OCSP Response message to the RI 500 (S115).

6) Then, the RI 500 transmits a move request response message, for instance, Move Device RO Response message, to approve a move of the rights object (RO) (S116). In addition, the RI 500 and the target device 120 carry out a rights object (RO) move procedure.

7) On the other hand, if the source device 110 is unable to receive the move request response message, for instance, Move RO Response message, then the source device 110 may resend the move request message, for instance, Move RO Request message to the RI 500 (S121). At this time, the source device 110 uses the same values of the reqID and nonce parameters of a previously resent move request message to construct the retransmitted move request message. However, the source device 110 uses a current value of the DRM Time that is recognized by the source device 11, as a value of the time parameter.

8) Then, if the RI 500 receives the move request message, then the RI 500 compares the received move request message with a previously received move request message (S122).

Specifically, the RI 500 checks whether or not ReplayCacheItem is stored in the memory. If ReplayCacheItem is stored, then the RI 500 compares the values of the reqID and nonce parameters within the received move request message with the values of the reqID and nonce parameters stored in the memory.

If the values of the reqID and nonce parameters match each other, then the RI 500 compares whether or not the value of the time parameter in the received move request message matches the value of the time parameter within the stored ReplayCacheItem.

If the values of the time parameter do not match each other, then the RI 500 regards the newly received move request message as the move request message, which has been resent by the source device 110, and transmits the previously stored 'processing result of message' to the source device 110 in the move request response message, for instance, Move RO Response message. Sending the move request response message in this way notifies that the move request message transmitted by the source device 110 is normally received, and furthermore, to prevent that the source device 110 from resending the move request message again.

If the source device 110 receives the move request response message, for instance, Move RO Response message, then the source device 110 checks a value of the status parameter within the move request response message. The rights object (RO) included in the move request message is deleted or the amount of the related state information is reduced if the value of the status parameter is Success, whereas the rights object (RO) remains in a reusable state if the value of the status parameter is Error. A more detailed description of this procedure will be provided later for reference.

9) As noted previously, the source device 110 may be manipulated by a person with a malicious intention or a device of a third person with a malicious intention may resend a previously sent move request message, for instance, Move RO Request message to the RI 500 (S131).

As noted above, when the RI 500 receives the move request message, the RI 500 compares the received move request message with a previously received move request message (S122).

Figure 6:
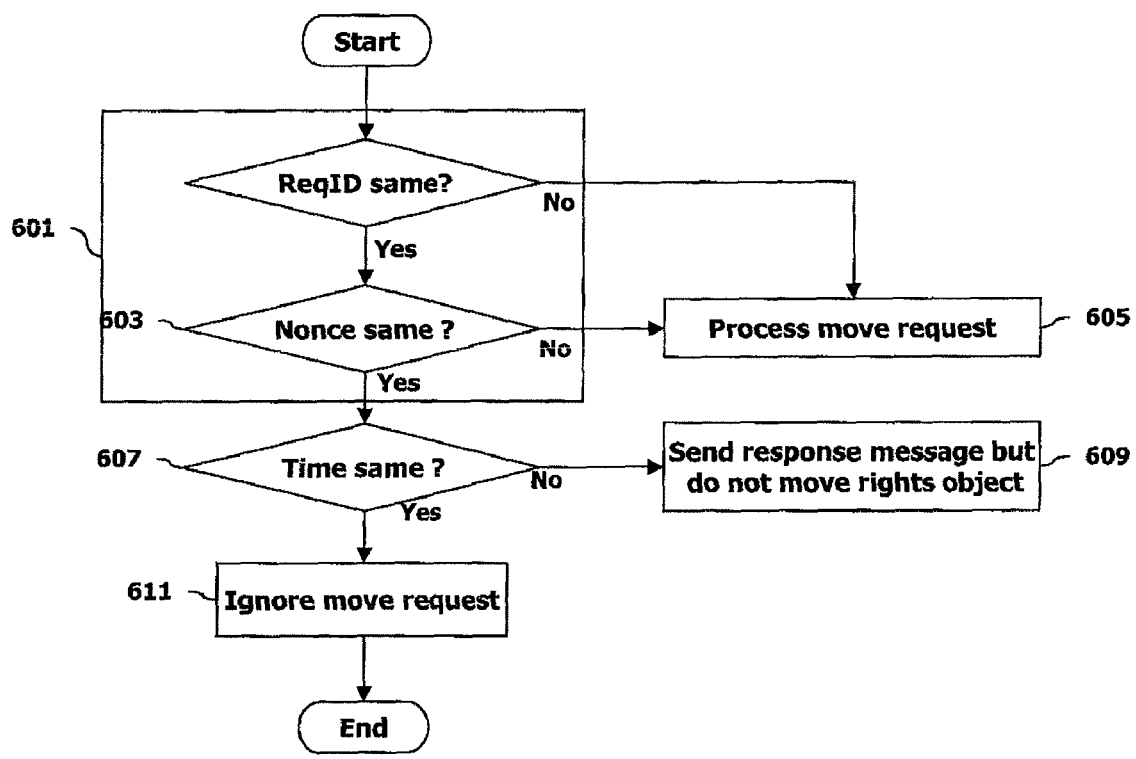
FIG. 6 is an exemplary view illustrating a portion of the method shown in FIG. 3.

Specifically, the RI 500 checks whether or not a ReplayCacheItem is stored in the memory, for instance, the replay cache as illustrated in FIG. 5. If stored or otherwise available, as seen in FIG. 6, then the RI 500 compares (step 600) the values of the reqID (step 601) and nonce parameters (step 603) within the received move request message with the values of the reqID and nonce parameters stored in the memory.

If the values of the reqID and nonce parameters match each other, then the RI 500 compares whether or not the value of the time parameter in the received move request message matches the value of the time parameter within the stored ReplayCacheItem (step 607). If the time values do not match, then the move request is processed (step 605). The comparison of the nonce value (step 603) may or may not depend on the results of the comparison of ReqID values in step 601. That is, the comparison of the nonce value (step 603) may or may not may or may not be concurrent with the comparison of ReqID values in step 601.

If the values of the time parameter match each other, then the RI 500 regards it as a replay attack and ignores the move request message (step 611). Alternatively, if the move request message is regarded as a replay attack, then the RI 500 transmits the move request message to the source device 110 by including the previously stored 'processing result of message' in the move request response message, for instance, Move RO Response message (step 609).

The aforementioned operation as illustrated in FIG. 3 will be described in more detail.

Hereinafter, it will be described a scheme for allowing the source device 110 to resend a move request message as well as allowing a DRM agent of the source device 110 and the RI 500 to prevent a replay attack from a malicious third person. In the following description, it will be described only the gist of the present invention, and the other explanation will be given in the contents of Replay Cache Management mechanism described in Open Mobile Alliance Digital Rights Management (OMA DRM) 2.1. the contents of which are incorporated herein by reference in their entirety.

1. Transmission of a Move Request Message, for Instance, a MoveDeviceRORequest Message The move request message, for instance, MoveDeviceRORequest message may be transmitted by a reception of a move request trigger message, for instance, Move Device RO Trigger message or by a user's command of a source device 110.

In order to package the move request message, for instance, MoveDeviceRORequest message, a DRM agent of the source device 110 will carry out the following procedure.

The source device 110 allows a user to select a rights object (RO) to be moved among many stored rights objects (RO) issued by the RI 500 or LRM. When a rights object (RO) is selected by the user, the source device 110 may check whether or not there is any <system> constraint in the <move> permission within the selected rights object (RO) and whether or not the rights object (RO) has any <system> constraint defined in the Move Device RO via a RI protocol.

The DRM agent of the source device 110 converts the selected rights object (RO) into an unusable state. If the rights object (RO) is a stateful rights object, and only a part of the rights object (RO) is moved, then only the part to be moved will be converted to an unusable state.

The DRM agent of the source device 110 generates a move request message including one or more <rightsInfo> elements. The generation of the <rightsInfo> elements will follow Section 7.1 in the OMA-SCE-DRM standard, the entire contents of which being incorporated herein by reference. If the rights object (RO) is issued by a RI, the DRM agent checks whether or not the RI indicated by a <signature> element included in the <rightsInfo> element is the same as RI 500. If the rights object (RO) is issued by a LRM, then the DRM agent checks whether or not the RI, which is indicated within the rights object (RO) to provide a service for moving a rights object, corresponds to the RI 500.

If the move request message is transmitted in response to a reception of the move request trigger message, then the DRM agent of the source device 110 transmits the move request message by using roapURL (Rights Object Acquisition Protocol Universal Resource Locator) within the move request trigger message. Otherwise, the DRM agent of the source device 110 transmits the move request message to riURL stored in the RI Context.

If an error occurs while transmitting the move request message to the RI 500, then the DRM agent of the source device 110 may resend the move request message. When resending the move request message, the DRM agent of the source device 110 should include a nonce, which has been included in a previous move request message, in the move request message to be resent in a similar way, and use a current value of DRM Time for the <time> element.

2. Processing of a Move Request Message, for Instance, a ROAP-MoveDeviceRORequest Message When the RI 500 receives the move request message, for instance, ROAP-MoveDeviceRORequest message, the following procedure may be carried out.

The RI 500 checks a <reqID> element within the received ROAP-MoveDeviceRORequest move request message to check whether or not RI 500 has a valid Device Context for the source device 110 that has sent a move request message. If the Device Context does not exist or is not valid (for example, invalid due to an expiration of a due date), then the RI 500 carries a NotRegistered error by loading NotRegistered error into the move request response message, and the processing will be aborted.

The RI 500 examines a <signature> element in the move request message. The examination of the <signature> element may follow the processing method of OMA DRM 2.1 (the entire contents of which being incorporated herein by reference). If the examination is not successful, then the RI 500 processes an error (for example, SignatureError, NoCertificateChain, InvalidCertificateChain or TrustedRootCertificateNotPresent) by loading the corresponding error into the move request response message, and the processing will be finished.

The RI 500 processes a <nonce> element in the move request message according to the Replay Cache management, as will be described later.

The RI 500 checks a <time> element in the move request message. The processing of the <time> element may follow the OMA DRM 2.1 processing method. As a result of the check, if the processing determines that the DRM agent of the source device 110 has wrong DRM Time, then the RI 500 carries a RequesterTimeError error by loading the RequesterTimeError into the move request response message, and the processing will be finished.

The RI 500 checks each <rightsInfo> element in the move request message according to Section 7.1.2 in the OMA-SCE-DRM standard, the contents of which is incorporated herein by reference. Additionally, the RI 500 checks whether or not a <rights> element within the <rightsInfo> element has a <move> permission that does not exclude the use of a Moving via RI protocol. If RI 500 does not have the <move> permission, then the RI 500 carries a MovePermissionNotPresent error by loading the MovePermissionNotPresent into the move request response message, and the processing will be finished.

If all the above steps are successful, then the RI 500 generates a move request response message in which a value of the <status> element is "Success".

The RI 500 then generates a copy of the rights object (RO), the copy cryptographically bound to the target device 120, with the contents of the RO based upon the <rights> element and the <rights> element's associated State Information received from the move request message.

When the RI 500 generates the copy of the rights object (RO) for the target device, the RI 500 specifies a value of stateful constraint within the <rights> element as a value of the <stateInfo> element in the received move request message. If the <rights> element has a count restraint in the <move> permission, then the RI 500 specifies a value of the <o-dd:count> element in the <move> permission by reducing it by one. The RI 500 uses a new value for a value of REK (RO Encryption Key), which is used to encode CEK (Content Encryption Key) constituting a <KeyInfo> element within the <asset> element. If a <moveIndication> element is present within the move request message, then the RI 500 should not include this element in the rights object (RO) for the target device. (Reference: If an original issuer of the rights object (RO) is a LRM, and the rights object (RO) has a signature of the LRM, then the rights object (RO) within the move request message will have a <moveIndication> element. If an original issuer of the rights object (RO) is a RI, then the rights object (RO) within the move request message will not have a <moveIndication> element.) Then, the RI 500 should include a <signature> element having a signature value for the generated <rights> element in the encoded rights object (RO).

(8) The RI 500 issues a rights object (RO) to the target device by using a 1-pass or 2-pass RO acquisition protocol or 4-pass confirmed RO acquisition protocol. In case of the 1-pass or 2-pass RO acquisition protocol or 4-pass confirmed RO acquisition protocol, the RI 500 sends a rights object acquisition protocol (ROAP) trigger to the target device 120.

3. Replay Cache Management

When the RI 500 receives a move request message, a <reqID> element and a <nonce> element may be checked as follows.

If the values of the <reqID> element and <nonce> element in the move request message match with the values of the reqID parameter and nonce parameter within the replay cache entry, respectively, then the RI 500 checks whether or not a value of a <time> element within the move request message matches with a value of <time> in the replay cache entry.

If the values of the <time> parameters match each other, then the RI 500 ignores the move request message. This is to prevent a replay attack from a third person using a previously transmitted move request message.

If the values of the <time> do not match each other, then the RI 500 generates a move request response message based upon the processing result stored in the replay cache entry, and sends the generated move request response message to the source device 110. This is to allow the RI 500 to resend the move request message as well as to prevent a replay attack of the resent move request message.

On the other hand, if the values of the <reqID> and <nonce> elements in the move request message do not match with the reqID and nonce parameters within the replay cache entry, respectively, then the RI 500 carries out a procedure for moving the rights object (RO) based upon the move request message. Then, the RI 500 stores a result of the move request message, for instance, a replay cache entry including Response Information and the <reqID>, <nonce> and <time> elements within the move request message, in the replay cache as illustrated in FIG. 5. The result of processing the move request message includes status, errorMessage, errorRedirectURL attributes, and the like.

Alternatively, if the values of the parameters do not match each other, then the RI 500 may first generate a replay cache entry as illustrated in FIG. 5 including a value of the <nonce> element and a value of the <time> element in the replay cache, and store a result of processing the move request message, for instance, Response Information, in the replay cache.

In other words, if the values of the <reqID> and <nonce> elements in the move request message do not match with the reqID and nonce parameters within the replay cache entry, respectively, then the RI 500 first generates a replay cache entry as illustrated in FIG. 5 including a value of the <reqID> element, a value of the <nonce> element, a value of the <time> element within the move request message. Subsequently, the RI 500 continues to carry out a procedure for moving a rights object (RO) based upon the move request message. Subsequently, the RI 500 stores a result of processing the move request message, for instance, Response Information as illustrated in FIG. 5, in the replay cache entry within the replay cache. Here, the timing of additionally storing the processing result may be a timing at which the move request message has been completely processed, or a timing at which the processing result is generated.

On the other hand, the RI 500 does not delete the replay cache entry until determining that the source device 110 will not resend by using the same nonce any more. Furthermore, the RI 500 may not delete the replay cache entry until determining that the <time> within the replay cache entry is still an effective value in view of DRM Time owned by itself. For example, if the RI 500 allows a tolerance of 50 minutes between the value of the <time> element within the move request message and the DRM Time owned by itself, that is, if a difference from the value of the <time> element on the basis of a current time shown in the DRM Time is less than 50 minutes, then the RI 500 do not delete the replay cache entry.

4. Processing of a Move Request Response Message, for Instance, a MoveDeviceROResponse Message.

When a DRM agent of the source device 110 receives the move request response message, for instance, MoveDeviceROResponse message, the DRM agent processes the move request response message as follows.

The DRM agent of the source device 110 checks whether or not the <reqID>, <resID> and <nonce> elements within the move request response message have the same values as those of a previous move request message. If any one does not match each other, then the DRM agent finishes a Move RI Rights protocol.

The DRM agent of the source device 110 checks a <signature> element in the move request response message. If the check is failed, then the DRM agent finishes a MoveDeviceRO protocol.

The DRM agent of the source device 110 checks a <status> element in the move request response message as follows.

If the status is "Success" and all of the rights object (RO) is moved, then the rights object (RO) included in a previous move request message will be deleted. If the status is "Success" and only part of the rights object (RO) is moved, then State Information will be modified based upon an amount of the rights object (RO) moved. For example, if the count remains 3 before carrying out a MoveDeviceRO protocol, and count 1 is sent to the RI 500, then the DRM agent modifies the count of the State Information to 2. At this time, if a <prURL> element exists in the move request response message, then the DRM agent should send a HTTP DET command to a URL indicated in the <prURL> element.

On the other hand, if the status is not "Success," then the DRM agent changes the state of the related rights object (RO) into a usable state, and the MoveDevice RO protocol will be finished.

A method according to the present invention as described above can be realized by software, hardware, or their combination. For example, a method according to the present invention can be stored in a storage medium (for example, storage means such as memory, hard disk, and the like), and can be implemented by a processor.

Figure 4:
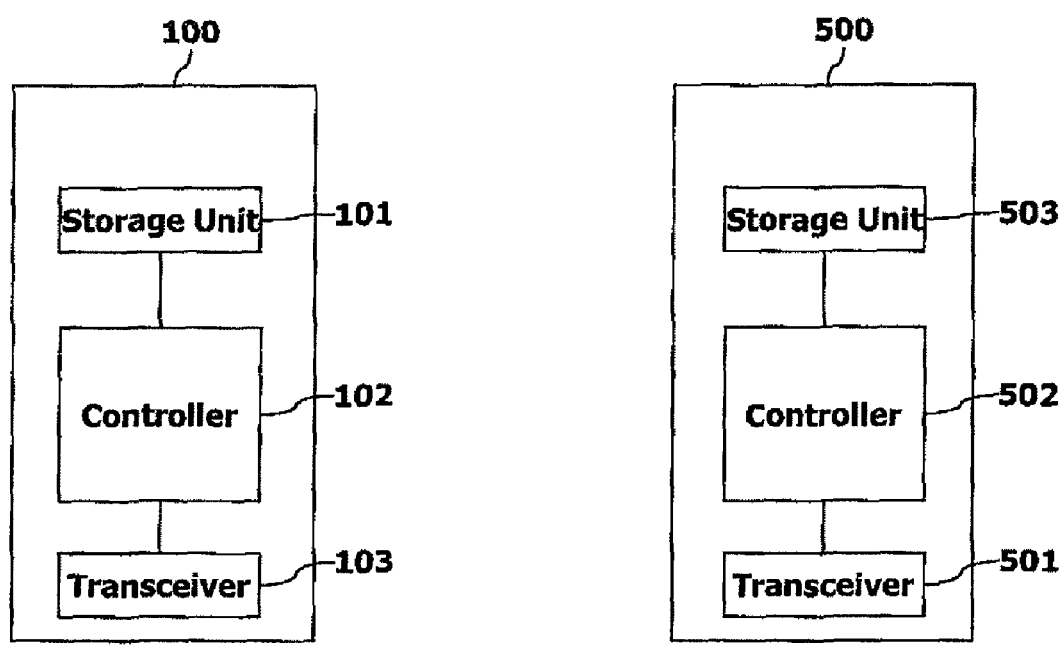
FIG. 4 is an exemplary view illustrating a configuration of an apparatus according to the present invention.

FIG. 4 is an exemplary view illustrating a configuration of an apparatus according to the present invention.

As seen by referring to FIG. 4, a source device and a target device 110, 120 (hereinafter, designated by 100) include storage means 101, a controller 102, and a transceiver 103.

The storage means 101 stores a DRM agent, contents, and a rights object (RO) for the contents. The controller 102 can implement the DRM agent, and reproduce the contents. At this time, the controller 102 may restrict a reproduction of the contents based upon the rights object (RO).

The transceiver 103 receives contents from a contents issuer (CI), and receives a rights object (RO) from a rights issuer (RI). Furthermore, the transceiver 103 transmits a move request message including <reqID>, <nonce>, and <time> elements to the RI 500 and receives a move request response message to move the rights object (RO) to another device.

On the other hand, as illustrated in FIG. 4, the RI 500 includes a transceiver 510, a controller 502, and storage means 503.

The transceiver 501 receives a move request message, and transmits a move request response message, as described above.

The controller 502 processes the move request message when receiving the move request message. Furthermore, the controller 502 checks the <reqID>, <nonce> and <time> elements within the move request message.

The storage means 503, as described above, stores a result of processing the received move request message, for instance, a result of processing the reqID, Nonce, and Time parameters within the message, in a memory, for instance, replay cache as illustrated in FIG. 5.

Though preferred embodiments of present invention are exemplarily described as disclosed above, the scope of the invention is not limited to those specific embodiments, and thus various modifications, variations, and improvements can be made in the present invention without departing from the spirit of the invention, and within the scope of the appended claims.

The invention claimed is:

1. A method of moving a use right, the method comprising:
   receiving, by a right issuing apparatus, a first request message for moving a rights object from a first device, wherein the first request message comprises a reqID element indicating an ID of the first device, a nonce element indicating a random value generated by the first device, and a time element indicating a time of the first device at the time of generating the first request message;
   comparing, by the right issuing apparatus, the reqID element and the nonce element in the first request message with each element in a replay cache of the right issuing apparatus;
   generating a new entry in the replay cache when the reqID element and the nonce element in the first movement request message are different from each element in the replay cache, wherein the replay cache is managed to prevent a third person's replay attack and process a retry of the request based on the first request message of the first device, and the new entry comprises at least one of the reqID element, the nonce element, and the time element included in the received first request message;
   generating, by the right issuing apparatus, a first response message;
   storing information related to results from processing of the first request message into the new entry;
   receiving, by the right issuing apparatus, a second request message from the first device, wherein the second request message comprises a reqID element which is the same as the reqID element in the first request message, a nonce element which is the same as the nonce element in the first request message, and a time element indicating a time of the first device at the time of generating the second request message;
   comparing, by the right issuing apparatus, the reqID element and the nonce element in the second request message with the reqID element and the nonce element of the new entry in the replay cache of the right issuing apparatus;
   comparing, by the right issuing apparatus, the time element in the second request message with the time element in the new entry when the reqID element and the nonce element in the second request message are identical to the reqID element and the nonce element of the new entry;
   generating, by the right issuing apparatus, a second response message when the time element in the second request message is different from the time element in the new entry, wherein the generated second response message includes at least one or more parameters based on the information related to the results stored in the new entry;
   transmitting the generated second response message to the first device; and
   ignoring the second request message when the time element in the second request message is identical to the time element in the new entry.

2. The method of claim 1, further comprising:
   suspending a processing related to the second request message after transmitting the second response message.

3. The method of claim 1, further comprising:
   determining, by the right issuing apparatus, whether the first device is registered in the right issuing apparatus by checking the reqID element in the first request message to determine whether a device context corresponding to the first device is stored in the right issuing apparatus; and
   when the first device is not registered in the right issuing apparatus, transmitting a message indicating a non-registered state to the first device, and suspending a processing related to the first request message.

4. The method of claim 1, further comprising:
   verifying a signature element in the first request message when the first device is registered in the right issuing apparatus.

5. The method of claim 1, wherein the step of comparing the reqID element and the nonce element of the first request message with elements in the replay cache of the right issuing apparatus comprises:
   comparing the nonce element of the first request message with a nonce element in the replay cache; and
   comparing the reqID element in the first request message with a reqID element in the replay cache when the nonce element in the first request message is identical to the nonce element in the replay cache.

6. The method of claim 1, wherein the information related to the results includes at least one of status, an errorMessage, and an errorRedirectURL attributes.

7. The method of claim 1, wherein the first request message is a MoveDeviceRORequest message.

8. The method of claim 1, wherein the first request message is processed as a new request when the reqID element and the nonce element in the first request message are not identical to elements in the replay cache.

9. The method of claim 8, wherein the step of processing the new request comprises:
    determining whether the time element of the first request message is a current DRM time recognized by the right issuing apparatus; and
    when the time element is not a current DRM time recognized by the right issuing apparatus as a result of the determination, terminating a processing related to the first request message, and transmitting a message including a RequesterTimeError state to the first device.

10. The method of claim 9, wherein said processing of the new request further comprises:
    verifying one or more rights information elements in the first request message; and
    determining whether a move permission element in the rights information element indicates the prohibition of the movement of the rights object.

11. The method of claim 10, wherein the first response message comprises a MovePermissionNotPresent state when the move permission element indicates the prohibition of the movement of the rights object, and
    the first response message comprises a status indicating success, and a rights object configured to be used in association with a second device indicated in the first request message is generated when the move permission element indicates the allowance of the movement of the rights object.

12. The method of claim 11, wherein the information related to the results includes at least one of the reqID element, the nonce element, and the time element in the first request message and a corresponding processing result of the first request message,
    wherein the information related to the results is maintained until the expiration of an effective time, and
    wherein the effective time is expired when a difference between a current DRM time recognized by the right issuing apparatus and a value of the time element in the first request message is greater than a predetermined value.

13. A server operated as a right issuing apparatus to move a rights object, the server comprising:
    a processor configured to:
    receive a first request message for moving a rights object from a first device,
    wherein the first request message comprises a reqID element indicating an ID of the first device, a nonce element indicating a random value generated by the first device, and a time element indicating a time of the first device at the time of generating the first request message,
    compare the reqID element and the nonce element in the first movement request message with each element in a replay cache of the right issuing apparatus,
    generate a new entry in the replay cache when the reqID element and the nonce element in the first movement request message are different from each element in the replay cache,
    wherein the replay cache is managed to prevent a third person's replay attack and process a retry of the request based on the first request message of the first device, and the new entry comprises at least one of the reqID element, the nonce element, and the time element included in the received first request message,
    generate a first response message,
    store information related to the results from processing the first request message in the new entry,
    receive a second request message from the first device,
    wherein the second request message comprises a reqID element which is the same as the reqID element in the first request message, a nonce element which is the same as the nonce element in the first request message, and a time element indicating a time of the first device at the time of generating the second request message,
    compare the reqID element and the nonce element in the second request message with the reqID element and the nonce element of the new entry in the replay cache of the right issuing apparatus,
    compare the time element in the second request message with the time element in the new entry when the reqID element and the nonce element in the second request message are identical to the reqID element and the nonce element of the new entry,
    generate a second response message when the time element in the second request message is different from the time element in the new entry,
    wherein the generated second response message includes at least one or more parameters based on the information related to the results stored in the new entry,
    transmit the generated second response message to the first device, and
    ignore the second request message when the time element in the second request message is similar to the time element in the new entry.

14. The server of claim 13, wherein the processor suspends a processing related to the second request message after transmitting the second response message.

* * * * *